(12) United States Patent
Klinkman

(10) Patent No.: US 8,823,197 B2
(45) Date of Patent: Sep. 2, 2014

(54) DIAGONAL SOLAR CHIMNEY

(76) Inventor: Paul Klinkman, Providence, RI (US)

( * ) Notice: Subject to any disclaimer, the term of this patent is extended or adjusted under 35 U.S.C. 154(b) by 116 days.

(21) Appl. No.: 12/813,052

(22) Filed: Jun. 10, 2010

(65) Prior Publication Data

US 2012/0153628 A1 Jun. 21, 2012

Related U.S. Application Data

(60) Provisional application No. 61/268,374, filed on Jun. 12, 2009.

(51) Int. Cl.
*F03B 13/00* (2006.01)
*F03D 1/04* (2006.01)
*F03G 6/04* (2006.01)
*F01K 27/00* (2006.01)

(52) U.S. Cl.
CPC . *F03D 1/04* (2013.01); *Y02E 10/72* (2013.01); *Y02B 10/30* (2013.01); *Y02B 10/70* (2013.01); *F05B 2240/13* (2013.01); *Y02B 10/20* (2013.01); *Y02E 10/465* (2013.01); *F05B 2240/131* (2013.01); *F03G 6/045* (2013.01); *F01K 27/00* (2013.01)
USPC ............................................. 290/54; 290/43

(58) Field of Classification Search
USPC ................... 290/54, 43, 2; 126/634
See application file for complete search history.

(56) References Cited

U.S. PATENT DOCUMENTS

| | | | |
|---|---|---|---|
| 1,112,203 A | 9/1914 | Fandrey | |
| 3,436,908 A | 4/1969 | Van Delic | |
| 3,523,192 A * | 8/1970 | Lang | 290/52 |
| 3,538,340 A * | 11/1970 | Lang | 290/52 |
| 3,846,519 A | 11/1974 | Spangemacher | |
| 3,894,393 A * | 7/1975 | Carlson | 60/641.1 |
| 4,033,126 A | 7/1977 | Newland | |
| 4,095,118 A | 6/1978 | Rathbun | |
| 4,136,674 A | 1/1979 | Korr | |
| 4,275,309 A | 6/1981 | Lucier | |
| 4,359,870 A | 11/1982 | Holton, Sr. | |
| 4,367,627 A * | 1/1983 | Pretini | 60/641.12 |
| 4,481,774 A * | 11/1984 | Snook | 60/641.14 |
| 4,497,177 A | 2/1985 | Anderson | |
| 6,201,313 B1 * | 3/2001 | Nakamats | 290/54 |
| 6,696,766 B1 | 2/2004 | Mamo | |
| 6,911,744 B2 | 6/2005 | Roskey | |
| 7,026,723 B2 | 4/2006 | Moreno | |
| 7,511,387 B2 * | 3/2009 | Fakhrai | 290/54 |

(Continued)

OTHER PUBLICATIONS www.enviromission.com.au/EVM/content/technology_technologyover.html.

*Primary Examiner* — Hae Moon Hyeon

(57) ABSTRACT

Heated air rises in a long, diagonal chimney up the side of a mountain. The airflow in the chimney turns wind turbines. Air entering the chimney's feeder tubes is heated in stages, where each stage has its own solar concentration and thermal insulation needs. Water, water vapor and air can be preheated as they are shipped to a chimney's lower end. Both low heat for preheating and high heat can be stored for night electricity generation and for continuing the chimney's electric production during cloudy periods. Water vapor rising a considerable elevation in a diagonal chimney will condense, giving up latent heat to the chimney air as it produces distilled water or mountaintop snow. Artificial thunderstorm cells downwind from the chimney are discouraged through a reduction in negative ions in the outgoing air and through thorough mixing of chimney air with the atmosphere at the chimney's top.

25 Claims, 21 Drawing Sheets

A diagonal solar chimney

(56) References Cited

U.S. PATENT DOCUMENTS

| | | | |
|---|---|---|---|
| 7,579,701 B1 * | 8/2009 | White | 290/43 |
| 7,821,151 B2 | 10/2010 | Le | |
| 8,408,199 B1 | 4/2013 | Klinkman | |
| 2010/0018205 A1 | 1/2010 | Chen | |

* cited by examiner

Figure 1: A diagonal solar chimney
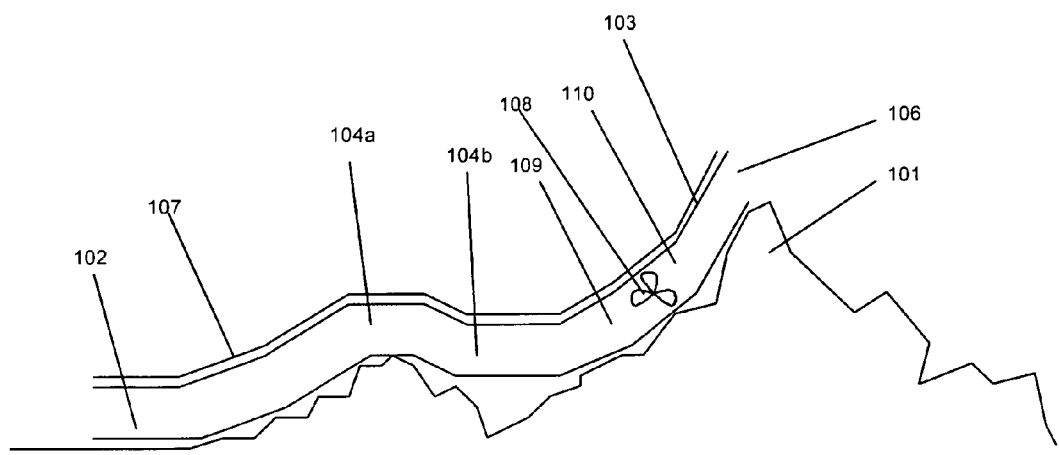

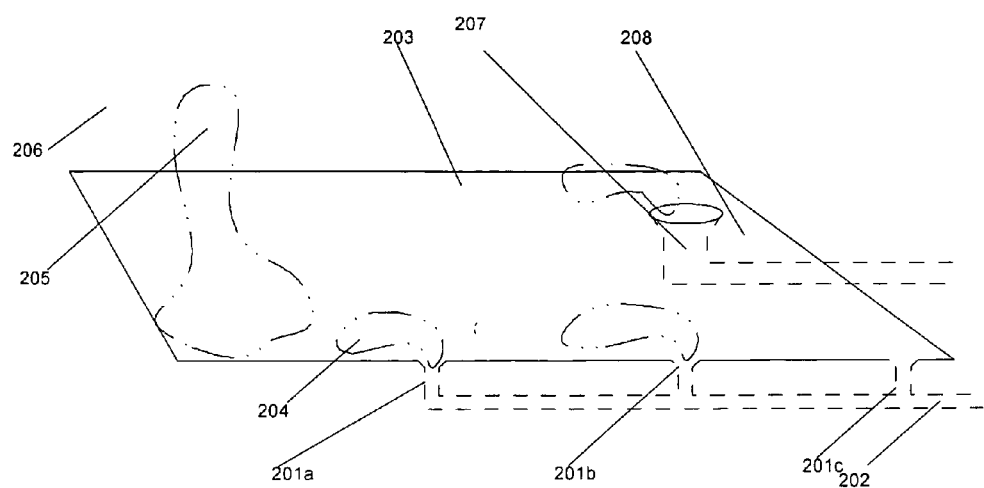
Figure 2: Warm air being siphoned off of a parking lot surface

Figure 3: An air-absorbing solar trench
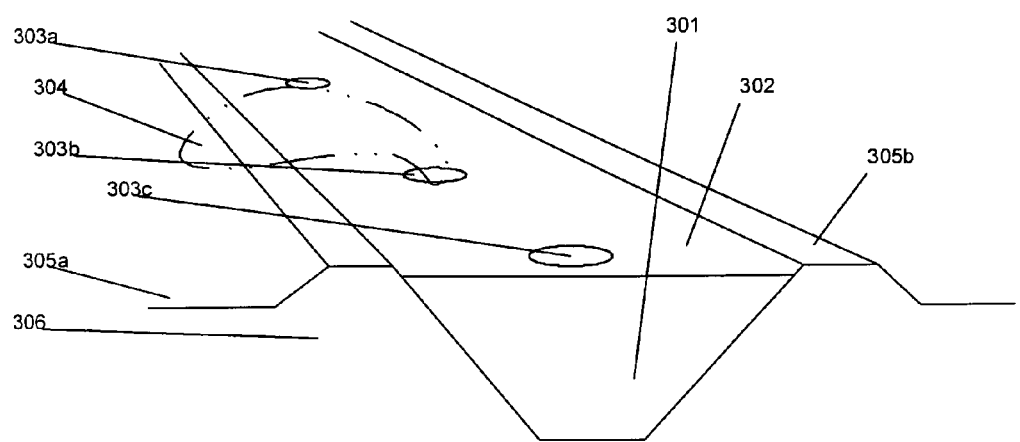

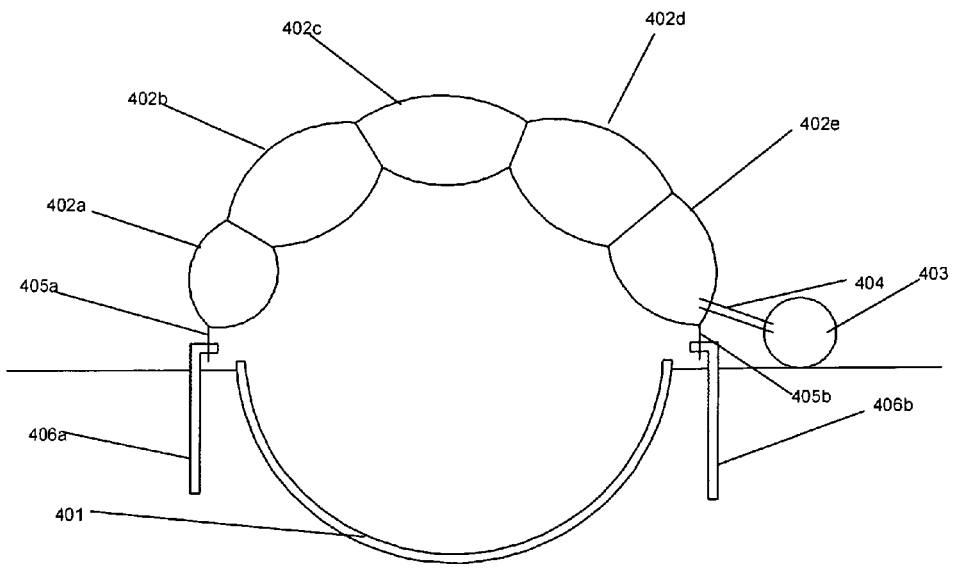
Figure 4: An inflatable roof on a solar trench

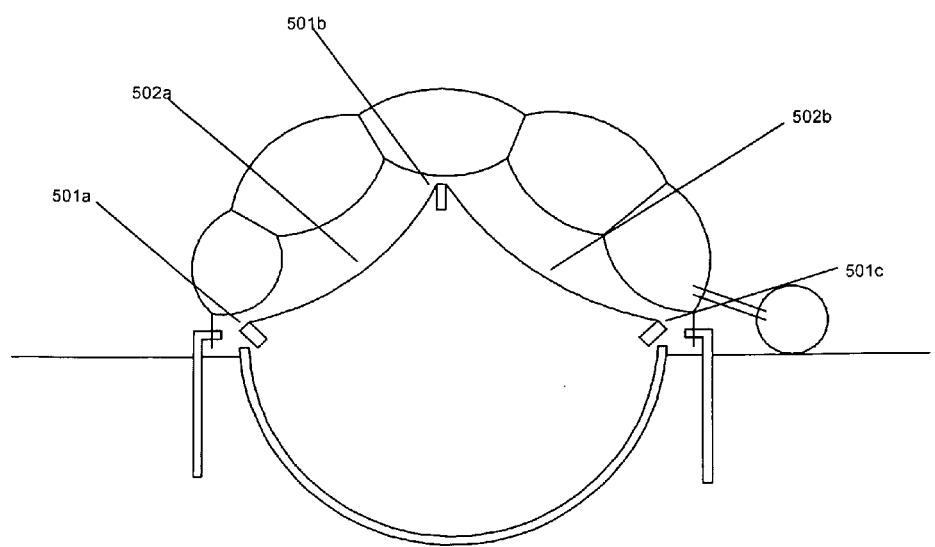
Figure 5: A fairing within an inflatable solar trench

Figure 6: A dugout east-west trench angled to improve solar uptake
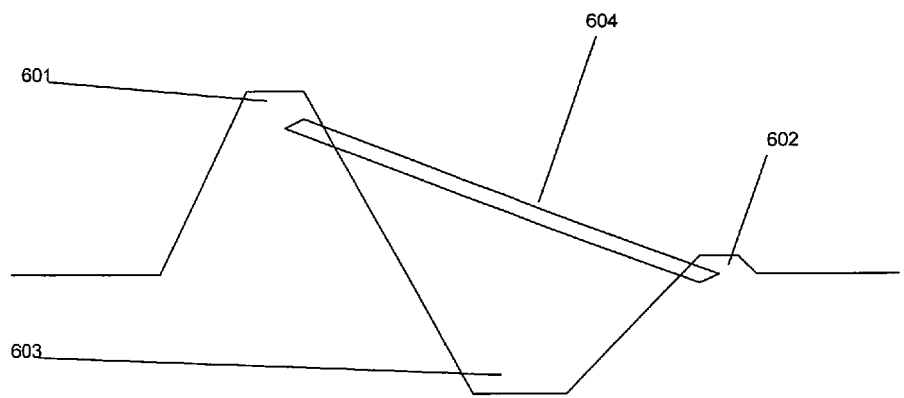

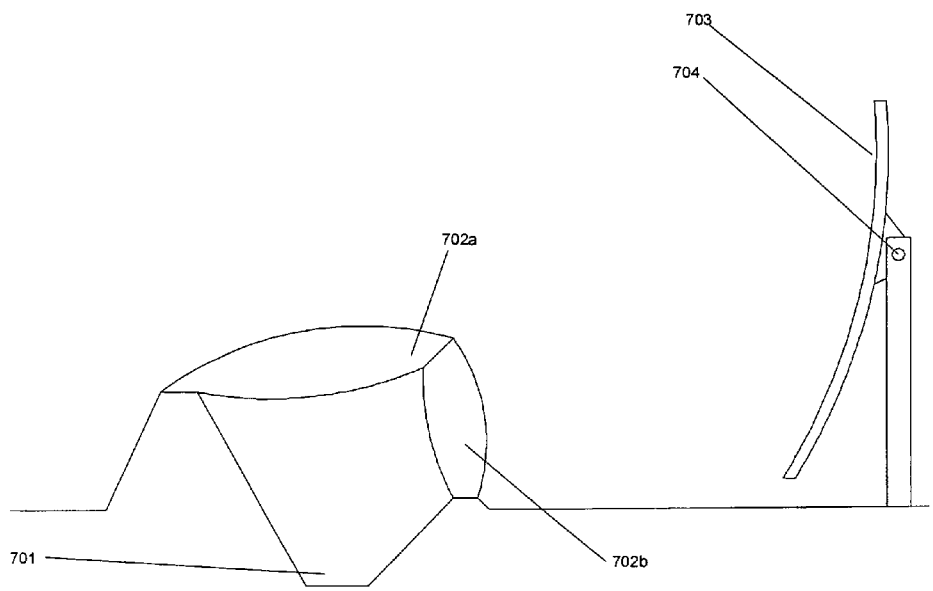
Figure 7: A linear trough and an inflatable roof on a solar trench

Figure 8: A linear trough and an inflatable roof on a solar water feeder trench
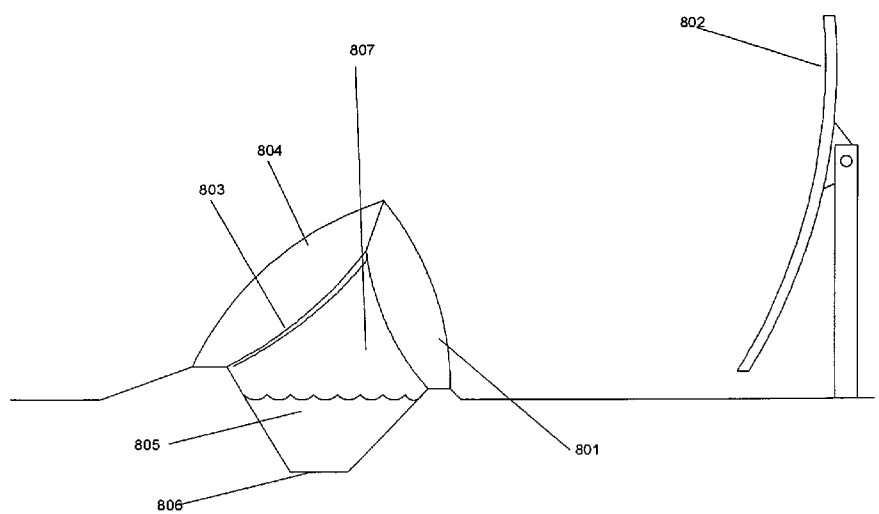

Figure 9: A two-stage air heating system using multiple linear troughs
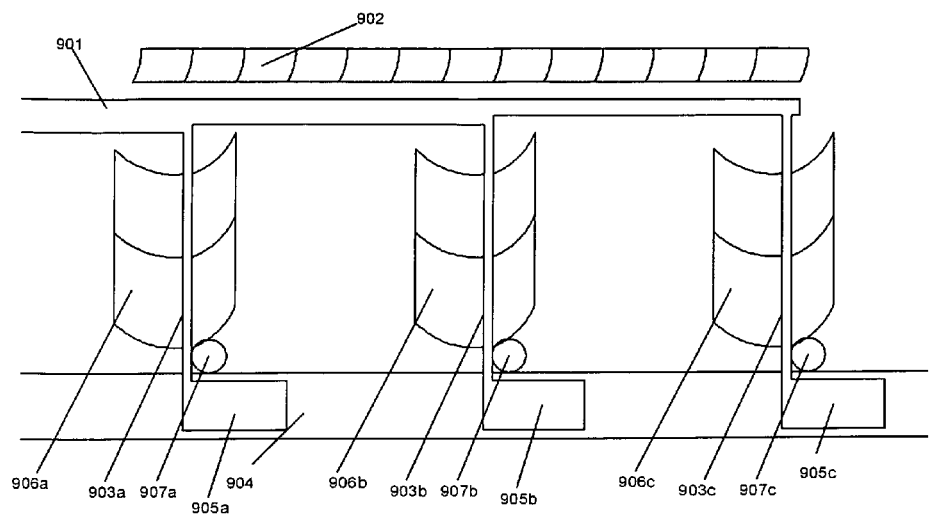

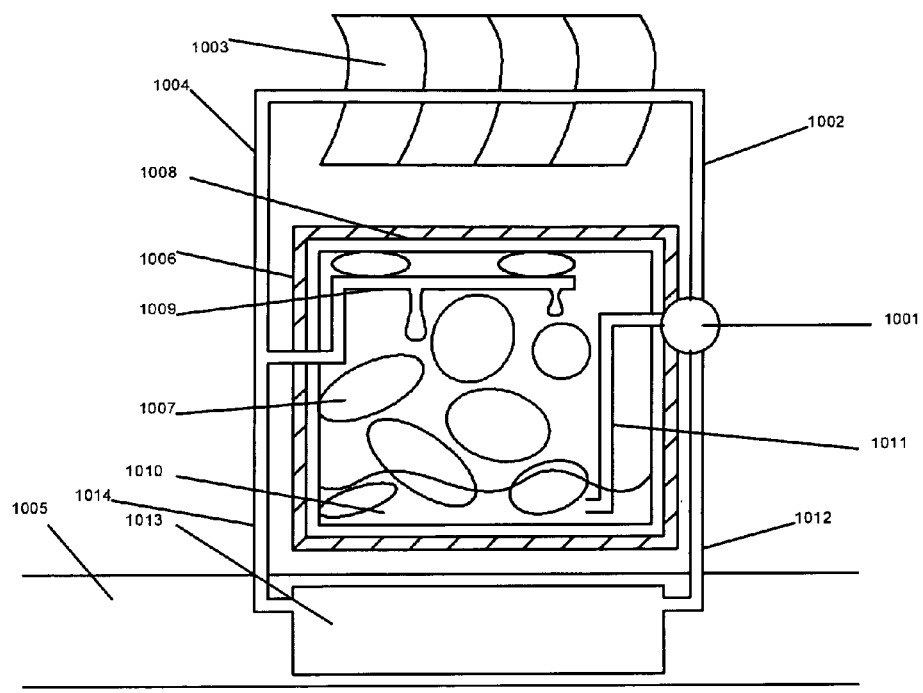
Figure 10: An oil-efficient heat storage tank

Figure 11: Sequestration of solar heat within a building filled with rocks
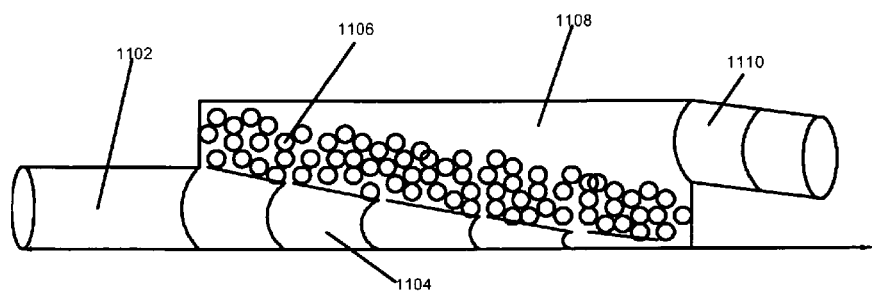

Figure 12: High intensity solar heat concentration on an air tunnel
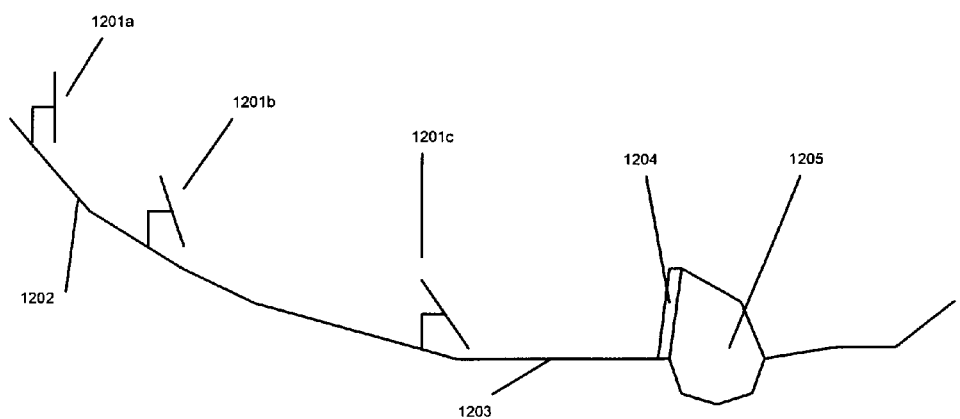

Figure 13: Several heat and moisture gathering methods working in concert
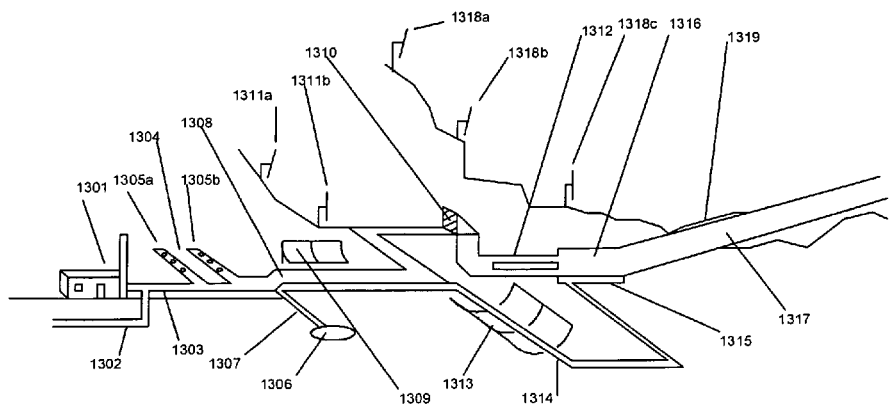

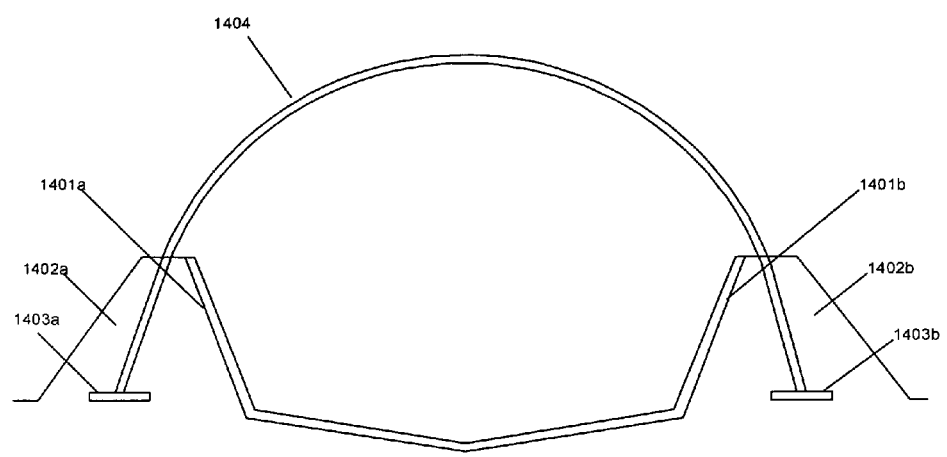
Figure 14: A pressurized chimney cross-section

Figure 15: Multiple layers in a pressurized chimney cross-section
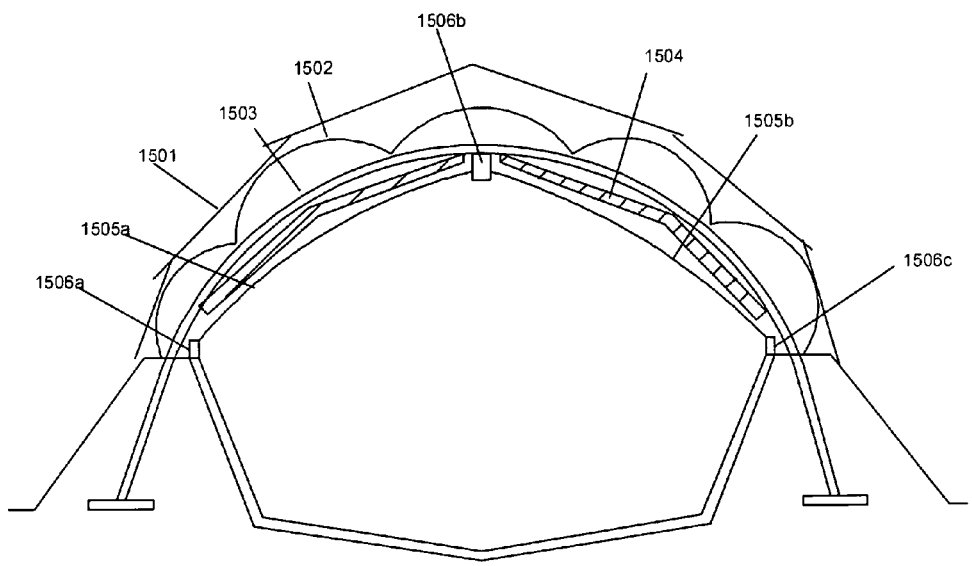

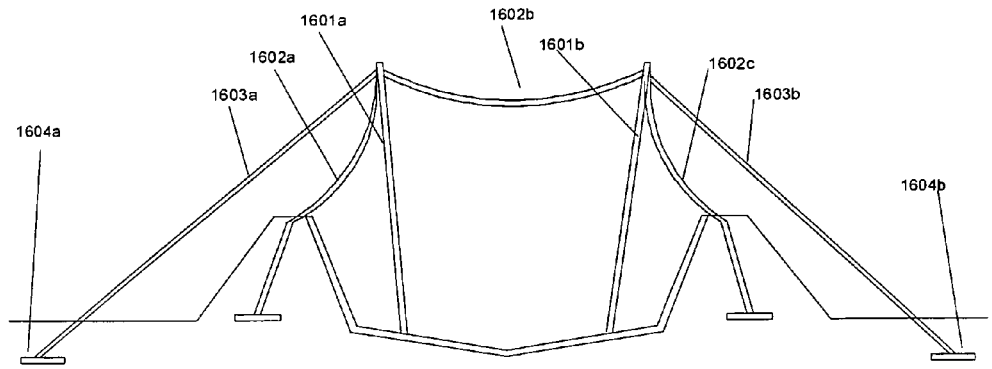
Figure 16: A negatively pressurized chimney cross-section

Figure 17: Channels inside a chimney for removing accumulating condensation
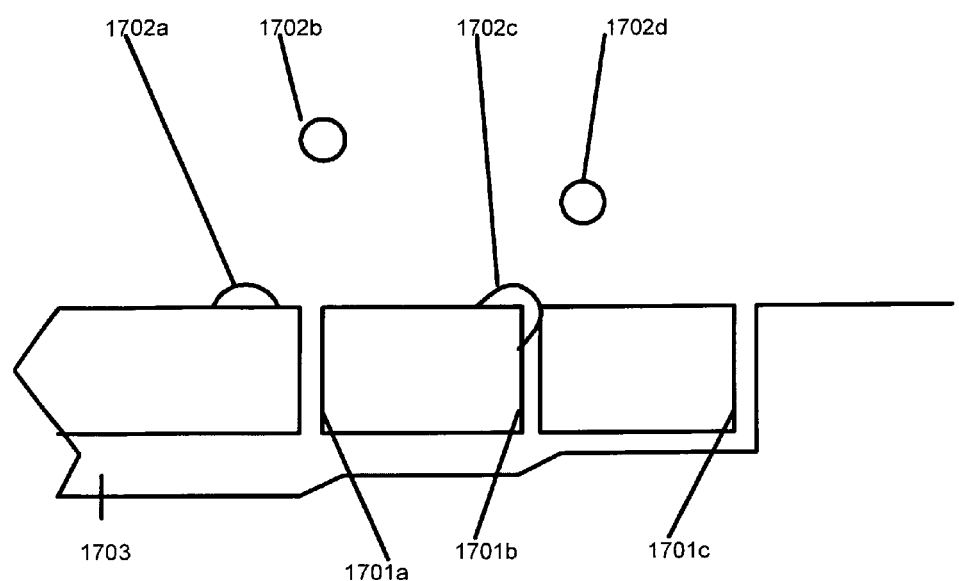

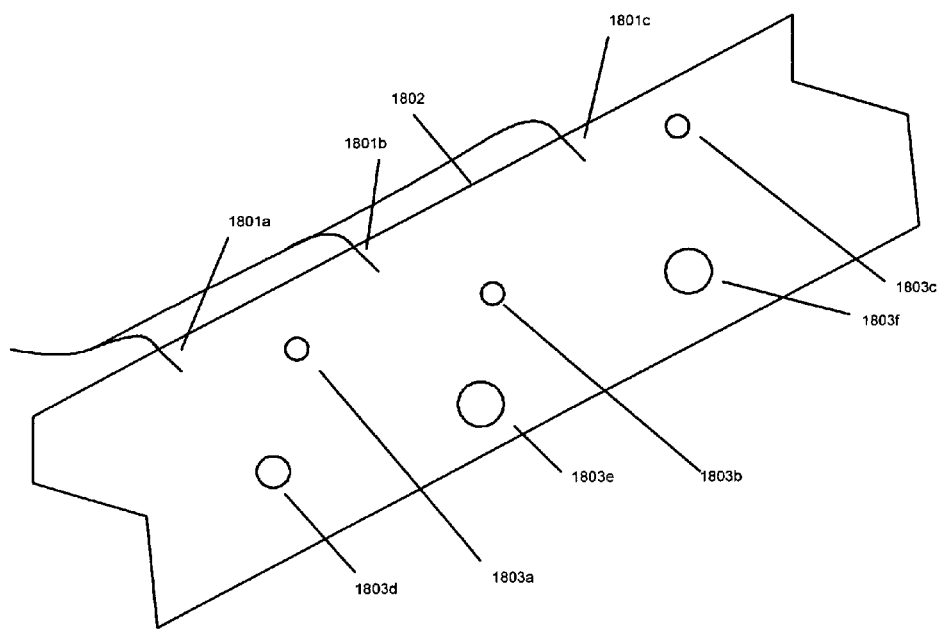
Figure 18: Ionization equipment inside a chimney

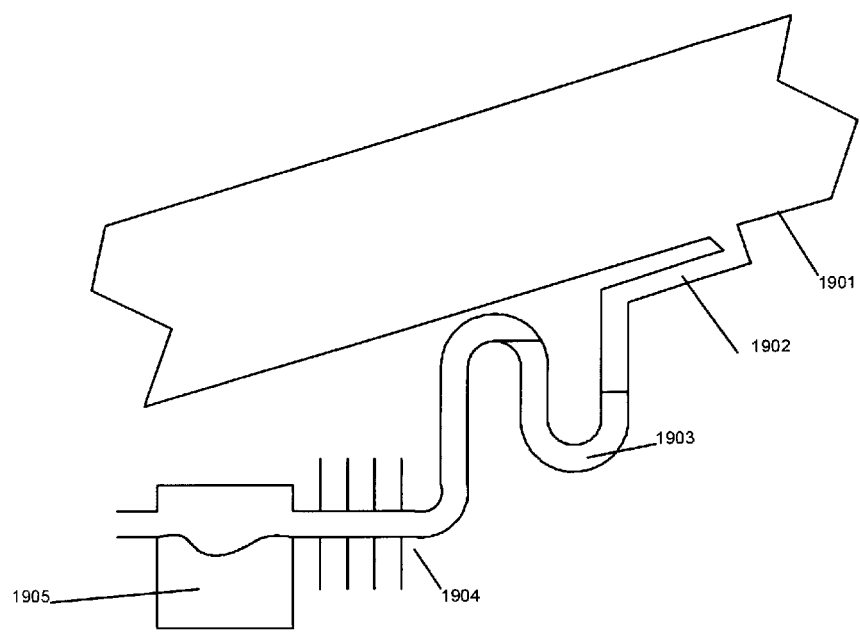
Figure 19: A method for removing water from a pressurized chimney

Figure 20: A method of releasing moisture-laden air from the top of a chimney

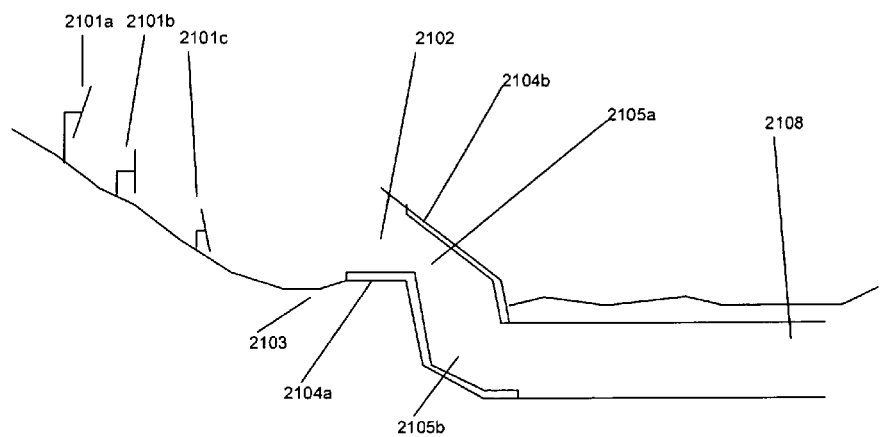
Figure 21: Direct concentration of solar energy into an air tube

DIAGONAL SOLAR CHIMNEY

CLAIM OF PRIORITY

This application for patent claims priority from provisional patent application 61/268,374 filed by the inventor on Jun. 10, 2009.

REFERENCES CITED

| U.S. patents | | |
|---|---|---|
| Pat. No. | Title | Issue date |
| 8,408,199 | Solar Reflector, Collecting Window and Heat Storage | Apr. 2, 2013 |
| 7,026,723 | Air filtering chimney to clean pollution from a city and generate electric power | Apr. 11, 2006 |
| 6,911,744 | System and method for converting wind into mechanical energy | Jun. 28, 2005 |
| 6,696,766 | Atmospheric cold megawatts (ACM) system TM for generating energy from differences in atmospheric pressure | Feb. 24, 2004 |
| 4,497,177 | Wind generating means | Feb. 5, 1985 |
| 4,367,627 | Systems for utilizing the energy of a moving air current | Jan. 11, 1983 |
| 3,436,908 | Solar Air Moving System | Apr. 8, 1969 |

FIELD OF THE INVENTION

This invention relates generally to electricity generation, and, more particularly, to solar-driven electricity generation.

BACKGROUND OF THE INVENTION

Numerous people in the last 50 years have been involved in technological efforts to generate electricity from sunlight. Some have mounted photovoltaic panels on sun-tracking swivels. Others have concentrated great amounts of sunshine on solar power towers that boil steam. Still others have concentrated sunshine on pipes filled with oil, which heats the oil to 800° Fahrenheit, where this heat eventually turns water into steam, which drives an electric turbine. Some have used solar heat to power Stirling engines.

One problem with boiling water by solar methods to create steam is achieving a 100° Celsius minimum boiling temperature. Numerous low-grade energy sources exist, including waste steam from solar power plants and from industrial plants, low-grade geothermal heat deposits, and surface air just above parking lots.

A 600 foot high, 30 foot diameter vertical solar chimney was built in Manzares, Spain. 11 acres of plastic on poles were deployed around the chimney. Each sunny day, air under the plastic grew hot. The hot air flowed up the chimney. The chimney had a strong enough draft that a wind turbine inside the chimney generated 50 kilowatts on each sunny day. Unfortunately, the cost of building the 600 foot tower made this particular electricity installation economically unusable. Also, the 600 foot tower was a minor aviation hazard.

The Manzares concept of gathering and heating local air by erecting a huge acreage of plastic sheets on 10 foot poles is seen as relatively expensive. The experiment's flat plastic sheeting appears to have been vulnerable to hail, to rain buildup and pondage on top of the plastic, to high wind damage and to rare snow accumulation. In addition, some commonly used plastics such as polyvinyl chloride will deteriorate in the sun's rays within 4 years.

A 3000 foot solar chimney was proposed in Australia. With greater elevation, the efficiency of the solar chimney would rise more than proportionally with height. Unfortunately, the cost of building a 3000 foot tall structure also rises more than proportionally with height. Cost versus benefits killed this project.

An inexpensive diagonal chimney up a mountainside was built and used in the 1900s to channel noxious fumes out of a northern New England valley from a smelting operation in the valley. A small rectangular trench was dug up the side of the valley to a ridge top, and the trench was lined and covered with slate stones. Hot air flowed from a smelter diagonally up the in-ground chimney to the ridgeline, at which point the noxious fumes blew away. The height of this chimney, hundreds of feet in elevation gain, was irrelevant to the builders, as the whole of the chimney rested on an existing mountainside.

U.S. Pat. No. 3,436,908, filed by V. VanDelic, describes a solar heat-powered diagonal chimney.

U.S. Pat. No. 4,367,627, filed by Gisberto Pretini of Pisa, Italy, describes a diagonal chimney used with a heat collection method and an air-turned turbine at the base of the chimney, used for power generation.

U.S. Pat. No. 7,026,723, filed by Mauricio Rodolfo Moreno of Santiago, Chile, describes a solar heat powered diagonal chimney traveling more than 1000 meters in elevation up a mountainside, which is used simultaneously for removing smog from a smoggy valley, and for generating electricity at the base of the diagonal chimney. With a smog-reducing diagonal chimney, asthma casualties in the valley are then reduced and people are better able to exercise outdoors. Air temperatures across the valley are reduced. The valley's humidity is reduced. Outside air becomes more breathable without first air conditioning the air, so that regional air conditioning needs are reduced. Overall, the valley becomes a nicer place to live.

This patent's author holds another U.S. Pat. No. 8,408,199, "Solar Reflector, Collecting Window and Heat Storage". That patent's reflector and target window design has advantages that will work in a number of solar applications, including the heating of air and water in feeder tubes leading toward the lower end of a solar chimney. Specifically, the reflector inexpensively concentrates heat, allowing for higher heat generation than with unconcentrated solar heating, with less heat loss at night and on cloudy days, the target window line is oriented to be shielded from rain and other weather problems, and the enclosure behind a line of target windows can maintain an air pressure differential for shipping a stream of air.

SUMMARY OF THE INVENTION

The cost/effectiveness of building a 300 to 6000 foot tall diagonal solar chimney is improved. Costs of heating air are lowered by preheating the air in many stages, where each stage of heating has unique solar concentration and insulation needs. A number of unique heat sources are tapped. A large-volume chimney lowers costs per kilowatt-hour produced as does running the chimney at a high temperature. Heat is stored for early evening electric generation.

Certain chimney walls are reinforced against outward pressure from air inside the chimney, while other walls are reinforced against inward air pressure. The chimney is designed to minimize wall stresses by relocating electric turbine locations within the chimney.

Adding water vapor creates kinetic energy in a tall chimney from the latent heat in water vapor. Adding water vapor to the chimney creates distilled water and a snow pack on the mountain. Adverse environmental effects of adding water vapor are inhibited as needed. Acquiring warm water and heating water in multiple stages is an efficient use of solar energy. Water vapor may also be acquired from various sources.

BRIEF DESCRIPTION OF THE DRAWINGS

FIG. 1 shows a diagonal solar chimney;

FIG. 2 shows warm air being siphoned off of a parking lot surface;

FIG. 3 shows an air-absorbing solar trench;

FIG. 4 shows an inflatable roof on a solar trench;

FIG. 5 shows a fairing within an inflatable solar trench;

FIG. 6 shows a dugout east-west trench angled to improve solar uptake;

FIG. 7 shows a linear trough and an inflatable roof on a solar trench;

FIG. 8 shows a linear trough and an inflatable roof on a solar water feeder trench;

FIG. 9 shows a two-stage air heating system using multiple linear troughs;

FIG. 10 shows an oil-efficient heat storage tank;

FIG. 11 shows sequestration of solar heat within a building filled with rocks;

FIG. 12 shows high intensity solar heat concentration on an air tunnel;

FIG. 13 shows several heat and moisture gathering methods working in concert;

FIG. 14 shows a pressurized chimney cross-section;

FIG. 15 shows multiple layers in a pressurized chimney cross-section;

FIG. 16 shows a negatively pressurized chimney cross-section;

FIG. 17 shows channels inside a chimney for removing accumulating condensation;

FIG. 18 shows ionization equipment inside a chimney;

FIG. 19 shows a method for removing water from a pressurized chimney;

FIG. 20 shows a method of releasing moisture-laden air from the top of a chimney;

FIG. 21 shows direct concentration of solar energy into an air tube.

DETAILED DESCRIPTION OF THE INVENTION

In the invention's primary embodiment as shown in FIG. 1, a diagonal chimney is laid on the side of sloping terrain (101). Laying the chimney diagonally on existing terrain reduces the engineering cost of supporting an extremely high altitude vertical chimney.

The chimney's bottom end (102) is substantially lower in elevation than its top end (103). Limited and gentle bends (104a-b) in the chimney may be built as needed to reduce engineering costs on unfavorable terrain, although they also reduce the chimney's available power. In use, air or other gases are continually drawn into the chimney's bottom end. The chimney's top end has an opening (106) to release air.

In this embodiment the chimney's roof (107) absorbs solar radiation. This heats the incoming air. The warmed air rises up the chimney.

In this embodiment, a wind turbine (108) is turned by the chimney's draft to produce electricity. This wind turbine placement in the middle of the chimney is better than the Pretini and Moreno designs in that the rising warm air column inside the chimney produces positive air pressure in the chimney space (109) below the turbine and produces negative air pressure in the chimney space (110) above the turbine. The earlier designs produce a higher negative air pressure throughout the chimney, especially in the chimney's lower half, which increases the engineering requirements for the chimney's walls and roof.

One embodiment adds water vapor to the chimney's air, which causes condensation within the chimney at higher elevations and which then releases heat into the chimney air, increasing the strength of the draft up the chimney. The condensation collects on the chimney's walls as fog or as precipitation. Several beneficial side effects may take place from water vapor condensation in the chimney, including the distillation of quantities of fresh water, and the removal of particulates and chemicals from the stream of air. Adverse environmental side effects of moisture are also possible. For this reason, separate sets of embodiments for processing dry hot air and moist hot air are developed.

When calculating the energy generated in a draft in a chimney, the chimney's heated air's temperature is always relative to the outside air's temperature. A particular chimney might run on, say, for example, 50° Fahrenheit air when the outside weather is 20° Fahrenheit, but the chimney would require 120° Fahrenheit air to get the same lift when the outside air temperature is 90° Fahrenheit. The amount of power generated by a particular chimney is proportional to the temperature difference between the chimney's air and outside air. A chimney, or any subsystem of the chimney, can potentially run at any temperature up to the melting, combustion or boiling point of one of its physical components, and with concentrated solar heating high temperatures might be achieved.

Great quantities per minute of warm air are needed to feed, say, for example, a 20-foot wide tube carrying air upward at, say, for example, 20 mph. Once all of the local warmed ground-level air is pulled into a chimney tube, the closest air locally available to the tube entrance will be colder air pulled down from the sky. For this reason, in one embodiment the chimney gathers ground-effect preheated air from a wide circumference around the bottom of the tube, air that has typically become 10° F. hotter than higher-up air, and possibly a bit moister, from contact with the heated ground. As air is pulled into the chimney, new replacement air pulled from higher elevations off the ground in each locality has a period to interact with the solar-heated ground and to become heated.

Insulating a long pipe or tube for shipping in extremely hot air to a site isn't particularly cost-efficient. Shipping in slightly warmed air, instead of hot air, is slightly less wasteful of heat. Because solar heat is often inexpensive when the sun shines in the deserts of western states, most of the air heating and heat storage can be done near the main air tube. Shipping in moist air, which contains latent heat in the water vapor, can be a more cost-efficient way of shipping in latent heat than trying to ship in hot, dry air from a distance. For any water vapor application, shipping in warm water is the most cost-efficient way to ship latent heat to the base of the chimney.

In the embodiment shown in FIG. 2, periodically spaced inlet holes (201a-c) on an underground air pipe (202), placed along the lee edges of a dark surfaced parking lot (203) given a prevailing wind direction which typically pushes air from the parking lot surface toward the inlet holes, suck in warmed parking lot surface air (204) before such air disappears upwards in thermals (205) into the colder upper air (206).

In this embodiment an existing parking lot drainpipe (207) is also used for air gathering. During the daytime a drainpipe can suck down warm air from the center of a parking lot. During the winter and at night, the ground (208) around the drainpipe (207) warms and moistens any draft of air flowing through such a pipe.

In one embodiment, relatively moist and geothermally warmed winter and night air is sucked from city or town sewer pipes for use in a diagonal chimney.

In the embodiment shown in FIG. 3, a trench (301) in the ground (306) with a black cover (302) through which inlet holes (303a-c) have been made at intervals, sucks down pre-warmed open desert surface air (304). In this embodiment the area directly on either side (305a-b) of the trench has been sprayed with tar to further heat the air near the inlet holes, and to heat the soil or sand around the trench (301) so that the heated soil or sand in turn eventually heats the air inside the trench.

Hot air, moist air, hot water and wastewater are common industrial, commercial, government and residential waste products. In some cases, industries will pay to have their excess heat re-used, their polluted wastewater evaporated or their polluted smokestack air scrubbed clean of particulates.

In one embodiment agricultural wastewater is pumped to the chimney site to be used as a source of water vapor. In one embodiment urban sewage is used. In one embodiment brackish mineral-filled water from desert wells is used. In one embodiment seawater is pumped inland through water feeder trenches to the chimney site. Excess heat and moisture might be acquired cheaply from a nearby smokestack, from a nearby waste stream of condensed steam, from a laundromat, from a mall, or from a greenhouse operation during the warmer months of the year. Various drying operations can produce waste moisture.

In one embodiment, warm water from a geothermal spring or well adds both moisture and heat to a stream of air. In one embodiment, geothermal water run through one or more radiator pipes adds heat to a stream of dry air without adding moisture.

In one embodiment, moisture is added to the hot air from an industrial smokestack and the air stream is sent up a diagonal chimney. At a higher altitude the moisture condenses, scrubbing particulates out of the smokestack air with fog droplets that either adhere to surfaces in the chimney and run down those surfaces, or that precipitate out of the chimney's air column, carrying airborne particles and chemicals out of the air stream. By this method the air is scrubbed. Later the distilled water and any precipitated dust particles may be separated by some method. The distilled fresh water may have value in a particular high altitude desert area.

Given a certain volume of air per minute to be moved through any particular diagonal chimney or air tube, an economic balance between the tube's construction costs and air friction losses within the tube will determine that air tube's diameter. For example, given that a certain volume of air is currently traveling through a certain tube, doubling the tube's width lowers the air's velocity through the tube by a factor of four, and air friction within the tube is related to the fourth power of the air's velocity. Given such a relationship, a wide enough tube will surely reduce any air friction to manageable levels, so that a workable tube can always be designed for any volume of air per minute.

In the embodiment shown in FIG. 4, a trench used to contain a stream of relatively unheated air has a substantially circular bottom half (401). This, plus a substantially circular top half cover maximizes the trench's cross-section for best airflow for its diameter. The trench's top half is a cover comprised of a structure of multiple air bladders (402a-e), designed to be very long in the direction of air flow, which are kept inflated by one or more air pumps (403) through one or more inflation tubes (404). The air bladder structure forms substantially a circular array of bulges around the trench/cover's hollow center that is used for shipping warm or hot air. A low positive pressure within the central part of the trench created by an air current pushing fan will also help to keep the cover inflated against various outside pressures. The sides of the air bladder structure have flaps or other connectors (405a-b) so as to connect the air bladder structure to anchors (406a-b) in the ground.

In the event of high winds, in one embodiment the air pumps deflate the bladder and a fan draws all air out of the trench's interior, and so the cover is held by vacuum flat against the trench's bottom. This flat position helps protect the cover inside the trench from wind-driven loose branches, from hail, from snow and from other weather hazards.

The long air bladders create an air stream passageway that has an arrow-straight air stream profile on the air bladder structure's inside. The inner surface generates nearly no air turbulence in the direction of the air flowing through it. Several bulges may be apparent going around the air bladder structure's inner circumference, but the air stream doesn't flow in that direction. In one embodiment a fairing is put over the spot where two bladder sections meet to keep the airflow profile continuous in the air stream's direction.

In one embodiment a section of an air feeder tube has an air bladder structure around its entire circumference, top and bottom. The air feeder tube is gently curved to have it rise and cross above an existing road, railroad or other obstacle with minimal inner air stream turbulence. In one embodiment, strong, resilient rings are installed around the air feeder tube's outside to keep the air feeder tube from bending shut in high winds.

In the embodiment shown in FIG. 5, long rods extending lengthwise in an air feeder trench (501a-c) hold a fabric or plastic fairing surface (502a-b) fairly taut. The fairing may bulge in or out between the rods, based on whether the air feeder trench has negative or positive air pressure compared to air outside the fairing, but in the lengthwise direction the fairing has no bulges. A stream of air moves smoothly down the air feeder trench without turbulence despite any bulges in the air feeder trench's outer layer.

Numerous small air-gathering trenches that only allow a low air velocity are an economical way to supply a single wide chimney with a stream of perpetual warm air flowing at 20 mph or better. The subgoal of building small air feeder trenches is to inexpensively transport somewhat moist, slightly warm air from distant spots, and to heat this air perhaps 20° F. above the outside ground air temperature as the trench air approaches the next air heating stage.

In the embodiment shown in FIG. 6, a small air feeder trench is plowed or shoveled from dirt, rock, sand or soil in a roughly east-west direction to create a high north side (601), a lower south side with a high lip (602) and a trench in the middle (603). A long covering (604) is attached to the tops of the north and south walls, enclosing the trench.

For low-humidity air gathering and heating, the lower south wall is high enough to keep rain out of the air feeder trench during a rainstorm or during winter melting. For high-humidity air gathering, no elevation of a south wall is used, so that rain may run in to the trench bottom from the south side. The rain will then either collect in the air feeder trench's bottom, or will sink into the trench's subsoil. Later solar heating of the ground around the air feeder trench will bring much of this moisture back up as water vapor into the trench's air stream.

In one embodiment, even when a small air feeder trench has to run roughly north and south, the north and south walls are not necessarily of equal height. A sharply tipped covering sheds hail, snow and pondage on the flexible covering from rainfall more effectively than a flat covering.

Some air feeder trenches are designed to gather small amounts of the surrounding ground-level air throughout their length. When in use they have a slightly negative air pressure. In one embodiment these trenches have small evenly spaced holes in their covering. In one embodiment air leaks through specific indentations made in the soil under the edges of a covering that has no holes in its surface.

The air feeder trench covering may vary. A simple black fabric covering will transmit a small amount of heat into the enclosed air on sunny days. A clear or translucent single layer plastic or glass covering will transmit the sun's heat to the trench's bottom. Ever more intensive heat-gathering air feeder trenches are useful as the heated air draws nearer to the chimney's bottom end.

In one embodiment a heat-absorbing trench is coated with a layer of a black or dark material on its bottom, say, for example, a spray of tar. Tar will also stabilize the trench's soil against cave-ins, and a thick layer may hold any rain in the trench's bottom for later evaporation into the air stream. Alternatively, a layer of tarpaper supported above the trench's bottom by an insulating layer will transfer a large percent of the absorbed solar heat into air heat, putting little of the heat into the ground below.

In one embodiment, a number of parallel east-west air feeder trenches are preferred in the vicinity of the chimney's bottom end, as opposed to north-south air feeder trenches or even to southwest or northwest air feeder trenches, because with high north walls, their transparent or translucent light-absorbing coverings can be aimed substantially 45 degrees south in the temperate Northern Hemisphere. They capture more solar heat.

All of the tons of earth underneath every air feeder trench need to be considered as a geothermal heat storage bank, capable of holding heat from summer to winter and from day to night, then partially powering the chimney in the bitter cold of winter and at night. Daily ground heat geothermal storage below the trenches will be important for late afternoon and nighttime chimney functioning. In one embodiment, trenches are surrounded with a darkened surface, say, for example, a two foot wide tarred area, to absorb heat into the ground. Much of the solar heat captured in the ground by this inexpensive surface eventually heats air in a nearby trench at night, or in some future week or season. Such a darkened surface may also serve as an access walkway for workers maintaining the trench system.

In one embodiment, thin heat-conducting spikes are pounded into the bottoms of the trenches before they are covered, and radiator fins are then attached to the top ends of the spikes. In operation these spikes slowly transmit captured solar heat deep into the ground during the day, then draw the banked heat up at night for preheating air inside the trenches. The radiator fins are slanted parallel to the trench's direction, to allow roughly optimal airflow through the trench.

As air moves down a heating air feeder trench on a sunny day, it gets hotter. Better glazing will be cost-effective for the hotter parts of trenches.

In one embodiment a progression of single glazed, then double-glazed, trench covers are used to cover an air feeder trench as the trench approaches a larger air feeder tube. The flow of air in the air feeder trench becomes hotter, and so more and more insulation becomes cost-effective to continue heating the air. In one embodiment the air feeder trench then progresses to a triple glazed cover.

In the embodiment shown in FIG. 7, a two-layer plastic enclosure is inflated over an air feeder trench (701). The enclosure's inflated bladders (702a-b) allow the enclosure to arch over the trench, which allows for a large air flow through the air feeder trench. As the air feeder trench is made of natural dirt, the air feeder trench's main expense is the plastic on top of the enclosure. The two layers of the bladders help to insulate the air feeder trench's air. The enclosure's inflated bladders keep the enclosure stiff against winds, against a slightly negative air pressure in the trench, and against other forces on the enclosure. A linear trough (703) running east-west and facing south, on a pivot (704) is focused on the enclosure, in order to deliver concentrated solar heat into the trench and to the trench's air stream. The top bladder (702a) may be, but doesn't necessarily have to be, transparent or translucent, as the concentrated light is focused only through the north-facing bladder (702b).

The process of constructing parallel rows of air feeder trenches may be streamlined. In one embodiment a single machine performs the following operations in a single pass: plow multiple parallel air feeder trench rows, tamp down the plowed steep air feeder trench sides, spray tar or another black substance onto the earthen or sandy air feeder trench walls, lay down the plastic enclosure covering, and staple or stake down the edges of the enclosure covering onto the air feeder trench's north and south walls. In other embodiments, these various operations may be performed by multiple pieces of machinery in multiple passes over the ground.

Shipping streams of air in various volumes, either moist air or hot and dry air, requires small, medium and large-scale air feeder tubes. Air feeder tubes may be of solid construction, they may be air-inflated tubes, they may be tent-like fabric tubes supported at regular lengths by poles, towers, girders or other structures, or they may be some combination of these construction methods. Air feeder tube walls may be under positive air pressure or negative air pressure from the air flowing inside them. Pressure affects the construction of the air feeder tube.

In one embodiment, several small covered air feeder trenches feed into a medium sized covered air feeder tube to more efficiently transport desirable air. The air feeder tube maintains a negative air pressure, which draws air in from the small air feeder trenches. As the air feeder tube progresses on and more small air feeder trenches feed it, the optimized air feeder tube needs to grow wider, deeper, taller, or otherwise more efficient at moving air.

In the embodiment shown in FIG. 8, a simultaneous concentrated solar heating and evaporation operation takes place in an air feeder trench. A air feeder trench running in a roughly east-west direction and partially filled with moving air (808) is covered with an insulated cover. Part of the cover (801) serves as a linear line of transparent window coverings. To the north, a linear trough of reflecting mirrors (802) refocuses sunlight southward, onto and through the transparent window coverings. Incoming light is then further reflected by a mirrored surface (803) on the south wall and roof (804) part of the cover, into a stream of water (805) in the air feeder trench: The air feeder trench's bottom (806) is painted black to transform light into heat, which is absorbed by the water. Moisture rises from the heated water into the air feeder trench's air (807) which is moving above the water, and in the same direction, at a faster rate of speed than the water. This embodiment may deliver a slight stream of moist warm air to the chimney, but its main product for delivery is a stream of water, progressively heated along the water feeder trench's entire length, delivered to the chimney's bottom. Because the air above the water feeder trench is saturated with water vapor, the stream of water suffers few unwanted evaporation losses in transit, and limiting the stream of water's evaporation rate by capping the stream limits the cooling of the stream in transit. Water can be a good heat transmission medium when evaporation is prevented.

In one embodiment, one or more pre-moisturized sources of air are added into the combination water feeder trench and air feeder tube. Starting with pre-moisturized air reduces evaporation en route and delivers moisture-laden air to the chimney.

In one embodiment the water feeder trench has a U-shaped contour. The U-shape maximizes water flow through the water feeder trench while it minimizes the width of the water feeder trench's roof or cover. In one embodiment pool liners of a standard width are used to line the water feeder trench. In one embodiment insulation batts are placed on the walls and bottom of the water feeder trench to reduce heat losses.

In one embodiment, small streams of water are regularly pumped out of the water feeder trench and run through solar-based or geothermal-based heating systems. Then the heated water is returned to the central water feeder trench for transportation to the chimney bottom.

As with an air transport tube, insulation and solar concentration may vary along the water feeder trench's length. The strongest solar heating concentration on such a water feeder trench, and the highest degree of insulation, will typically be installed near the chimney.

Geothermal hot water sources are commonly found throughout the American West. A few valuable geothermal sites can be mined to produce live steam, but many more sites can simply produce hot water. In one embodiment, warm water from a geothermal heat source is shipped in to the vicinity of the chimney's bottom by a covered water feeder trench.

In the embodiment shown in FIG. 9, a covered water feeder trench (901) and a south-facing concentrating linear trough (902) run due east-west on their way toward the chimney base. The south-facing linear trough concentrates sunlight through a transparent, translucent or heat-conducting surface into the covered water feeder trench. The east-west water feeder trench feeds warm water into a series of pipes (903a-c). These pipes run due north-south toward an air feeder tube near the chimney's bottom end (904). Inside the feeder tube, evaporation ponds (905a-c) convert the water into water vapor. The pipes receive concentrated reflected solar heat from a linear trough of reflectors (906a-c) surrounding the pipes. Tracking mechanisms (907a-c) keep the linear troughs on target throughout the day. During a sunny period, water may exit the pipes at the air feeder tube at slightly above or just below the boiling point of water. This combination of two different types of linear troughs for medium heating and for high heating delivers water vapor to the feeder tube efficiently.

A diagonal chimney's bottom end is typically placed at the bottom of a mountain or on other steep natural terrain. In one embodiment, the south-facing acreage on the mountainside is used to heat either water or oil. Unlike air, neither water nor oil expands significantly when heated, until the water is superheated and turns to steam.

In one embodiment, live steam is a major component of the gases used in the diagonal chimney.

In the embodiment shown in FIG. 10, during sunny periods oil is pumped uphill by a pump (1001) through a pipe (1002) and is heated on a mountain slope with a solar trough (1003). Current oil-based solar trough systems are able to heat oil to 800° Fahrenheit. Then the oil is brought back downhill in a return pipe (1004) and fed into a nearby heat storage tank that is near the lower end of the chimney (1005). South-facing mountain slopes in arid climates currently tend to be rather inexpensive real estate, as their slope makes them relatively uninhabitable land, but for purposes of this chimney they are good for heating oil or water.

In this embodiment the large heat storage tank, which is surrounded by insulation (1006) is filled with pebbles or rocks (1007). The tank's roof (1008) rests upon the rocks. Oil drips from pipes (1009) resting below the tank's ceiling, down through the rocks, to a small pool of oil (1010) on the tank's bottom. This pool of oil flows into a pipe (1011) which leads to the pump, to close the oil circulation loop. In use, the oil heats the pebbles during the day and takes heat from the pebbles at night. The hundreds or thousands of tons of pebbles help to store heat more cheaply than an all-oil heat storage tank. When heat is needed, oil may travel through a pipe (1012) to a heat exchanging unit (1013) within the base of the chimney, and back to the heat storage tank through a return pipe (1014).

Such a rock/oil system would be similar to rock/hot water storage systems already in use. One advantage of setting up a large-scale rock-filled heat storage tank with a roof sitting on the rocks is that the engineering of supporting the pond's large roof and the pipes below the roof becomes simpler. With an enormously deep and wide heat storage tank of rocks or pebbles, every section of the roof and every pipe rests on a layer of pebbles. The pebbles can be piled so that rainwater runs off of the roof. Because the heat storage tank is supported on its sides and bottom by the ground, the engineering of the heat storage tank's sides and bottom are also reasonably inexpensive. If the oil is only about 1 foot deep on the bottom, the idea of heat storage tank leakage might not be much of an engineering problem. Nor does the system need much oil to operate. Strong, crush-resistant insulation below the heat storage tank's bottom is preferred. In one embodiment, dry sand is used as a crush-resistant insulation material for the heat storage tank's bottom and sides.

In one embodiment a chimney is built with a fixed amount of wind turbine generating capacity. A single maximum and minimum amount of power within the chimney is set. A tiny amount of airflow within the chimney generates zero power in the turbines. Such an embodiment using dumb wind-generating turbines saves money. Such a chimney's controllable heat storage capacity enables the chimney to produce electricity at its rated capacity for a fairly long time period every day, spending only the minimum heat needed to run the turbines during each hour of generation. Stored heat enables peak-load electric production to continue evenly when a cloud rolls overhead, at night when the nighttime outside temperature drops, when the chimney is required by environmental regulations to switch from moist air to dry air, when a cold front comes through the area, or for a number of weather-related reasons. In this embodiment a heat storage system enables the chimney to typically produce electricity during the critical 4:00 pm to 8:00 pm period, when many other solar plants can produce little or no electricity, at a time when premium peak load power prices are often offered by electric utilities. It enables the turbines to generate electricity into the night when outdoor temperatures have dropped, or to save power overnight for a rush hour peak load around dawn the next morning. Generating wintertime peak-load power at dawn may have a premium value to electric utilities, increasing the chimney's value.

Heat storage becomes more efficient with size. If the radius and depth of a rock-filled heat storage tank is doubled, the amount of heat that the heat storage tank can hold is increased by a factor of 8, but the outside area of the heat storage tank only grows by a factor of 4, so heat loss drops by at least a factor of 2 relative to the amount of heat stored.

In one embodiment a closed loop heating system uses a mixture of water and an antifreeze substance. The closed loop water used in the gathering of heat need not be related to any water being boiled off for water vapor. Such an embodiment can't reach the high heat range that an oil-based closed loop can reach, but such a system can reach 200° Fahrenheit.

In one embodiment, an antifreeze-based closed heating loop with a heat storage tank preheats a stream of air for a second oil-based closed heating loop with a heat storage tank.

In the embodiment shown in FIG. 11, large volumes of air from an inlet feeder tube (1102) are forced at low velocities through one or more air feeder tubes (1104) at the bottom of a field of rocks (1106). Numerous small streams of air percolate up through the field of rocks to an airspace (1108) for collecting air, which leads to an outlet air feeder tube (1110). In use, on a sunny day great volumes of hot air are evenly distributed through the field of rocks. They transfer some of their heat to the rocks. At night or in cloudy times, cooler air travels through the field of rocks and the air becomes warmer and usable in the chimney.

In one embodiment, branch air feeder tubes join other branch air feeder tubes in nearly parallel directions at junctions, so that air currents flow smoothly together. To reduce air turbulence, no sharp curves are built into air feeder tubes.

In the embodiment shown in FIG. 12, an array of independently focusing reflectors (1201a-c) on a hillside (1202) around a valley floor (1203) focuses sunlight continually on a heat-tolerant wall (1204) of the solar chimney (1205) near the chimney's bottom end. Given certain terrain, a good-sized amphitheatre of tracking reflectors can focus on a single solar target or on a line of targets. The heat-tolerant wall transmits heat inside the chimney, so that this extremely concentrated sunlight superheats air inside the solar chimney, increasing the power to the chimney's updraft at a low heat procurement cost. In one embodiment, the entire north wall of a substantially long tunnel section is used as a heat-tolerant solar energy collector, where various tracking reflectors are assigned to certain wall sections, so as to distribute a huge amount of heat onto the wall properly.

Heating air to a specific operating temperature for chimney use, or heating water to a specific temperature near its boiling point, is a process best done at or near the bottom of the chimney tube, so that significant heat isn't lost before use. The closer that air heating is done to the chimney's bottom end, the less heat is lost before use, and the less needs to be spent on insulating the tubes. However, the sunshine to be used may be spread out over a wide acreage, so either preheating must be done over a wide area or else heat must be shipped with plenty of insulation to the chimney's bottom.

In the embodiment shown in FIG. 13, a number of previously mentioned heating designs are economically combined. Streams of moist air are obtained from an industrial plant's steam discharge outlet (1301) and from a town's sewer system (1302) by an air feeder tube (1303). Local air is drawn in from nearby fields (1304) through heating trenches (1305a-b). Warm water is shipped in from a geothermal spring (1306) through a water feeder trench (1307). An enclosed combination water feeder trench and air tube (1308) is heated with linear trough concentrators (1309). The air stream is fed underground (1310), along with superconcentrated sunlight from tracking reflectors (1311a-b), and through heat storage channels dug into the rock (1312). The imported water is heated to the boiling point in a solar linear trough (1313) and is passed through a pipe (1314) to an evaporation pond (1315) in the underground start of the chimney (1316). Further heating of the air flow takes place where the solar chimney arises from underground (1317). More solar reflecting tracking mirrors (1318a-c) concentrate their heat onto a target (1319) on the chimney.

In one embodiment, an array of small heat storage channels in the ground are created by laying a network of pipes, covering the pipes with dirt or rock, and covering the rock with an insulating roof that keeps rainfall out of the array.

Large tubes carry air at faster velocities with less friction, and so they may reduce costs per unit of power generated. In one embodiment, a large oval chimney tube which hugs the ground carries air. The oval tube is built at slightly less cost than a circular tube. The oval shape slightly reduces the tube's wind profile to crosswinds outside of the tube.

In the embodiment shown in FIG. 14, the left and right edges (1401a-b) of the chimney are sheltered with high dirt or concrete banks (1402a-b). The embankments lower the chimney's outside horizontal wind profile, reducing engineering requirements. The embankments also provide mass for anchors (1403a-b) with which to anchor the ends of cables (1404) which wrap around the chimney's top. These cables carry the strain of containing considerable positive air pressure within parts of the chimney. Where the chimney holds negative air pressure, the embankments contain the negative pressure on the walls. In addition, the embankments bear any lateral wind pressure strains on the walls of the chimney.

Large chimneys rising up mountains will often need to contain strong air pressure gradients, especially within any tube sections just before and just after the air stream travels through a wind turbine. Air pressure is the power that drives the wind turbines.

In one embodiment, certain sections of chimney roof designed to push downward against positive air pressure are weighted. During periods of operation when positive air pressure is generated, the chimney roof's weight helps to push downward against the added pressure. The roof has substantially evenly spaced towers and cables to lift the roof up when this positive air pressure is gone during times of no power generation, and other cables wrapped around the chimney pull inward when inside pressure is maximized. By designing the same structure to equally handle downward and upward stress, the maximum stress on the chimney roof can be reduced by 50% by adding weights equal to 50% of the maximum upward pressure.

In the embodiment shown in FIG. 15, a solar chimney roof has multiple layers to deal with multiple engineering needs. The outermost layer (1501) blocks ultraviolet rays and protects the inner layers from water leakage, pounding from hail, blowing branches and sparks from wildfires. Beneath the outermost layer, a positive pressure containment layer (1502) girded by cables (1503) holds the chimney roof in place against positive pressure. Beneath the pressure containment layer an insulation layer (1504) reduces heat losses. Beneath the insulation layer a fairing layer (1505a-b) held in place by guide struts (1506a-c) reduces air turbulence in the air mass moving up the chimney at a fairly high velocity.

In one embodiment, the pressure fabric has blowout panels at certain spots on the chimney. The blowout panels release under excessive pressure, saving the entire pressure vessel from a catastrophic rupture. In one embodiment, each blowout panel has Velcro release latches, and after the pressure drops, the blowout panel falls back into place and the panel's Velcro strips latch back together, resealing the pressure valve after use.

In the embodiment shown in FIG. 16, within a negative pressure section of chimney, internal struts (1601a-b) are positioned within the chimney. In the direction of the air stream flow, these struts have substantially an airplane wing or teardrop profile for low aerodynamic friction within the tube. The struts hold up cables (1602a-c) that, as before, are draped with a tough fabric hung between adjoining cables. This time the fabric is outside of the cables and the fabric bows inward with pressure.

These internal struts are also connected to outside cables (1603a-b), which hold the struts in place. The cables are connected to anchors (1604a-b) in the ground beyond the left and right sides of the chimney, and cables also connect the outside ends of diagonally adjoining struts, keeping the entire superstructure in place. As with a positive air pressure vessel structure, a weather layer, an insulation layer and an inner fairing layer may be added to this negative air pressure vessel structure.

Gentle curves in the chimney, in order to navigate the curves in a ravine, for example, will lead to minor power decreases in the chimney. Occasionally building a bridge across a ravine where a pressure vessel stretches all the way around the chimney, making a cut in a particular mountain, or even tunneling through a hill and surrounding the chimney with rock or concrete, will be better from an engineering standpoint than overly curving the chimney tube to fit the terrain. Just as the routes of interstate highways are carefully chosen in mountainous areas, so the path of each chimney will need to be crafted to a particular mountain in order to balance power losses with construction costs.

In one embodiment, a chimney's air flow is squeezed into a narrow corridor which leads to a wind turbine. A gradually expanding tail race behind the turbine helps to minimize air turbulence.

In one embodiment, a wind turbine's blades are matched to a slower air flow up the chimney by making the blades wider. The wider blades help to obviate the added expense of generating higher pressure air flow choke points.

In one embodiment, two or more turbines are placed in series at different elevations on the chimney. Under this embodiment, the positive and negative pressures in various parts of the chimney near these multiple turbines are much less than if a single turbine were to handle the total positive and negative pressures that a very long chimney could generate. For example, a chimney with a 6,000 foot rise might have 60 turbines all in series in the chimney, with each turbine placed 100 feet in elevation from the next turbine. The maximum overpressure and underpressure forces near each small turbine would be $1/60$ of the maximum overpressure and underpressure forces near a single turbine in a similar 6,000 foot rise chimney. Thus, generating power with a series of small wind turbines lowers the chimney roof's engineering costs by a factor of 60. Research is needed to see if synergistic power generation factors at a single air choke point are more important than reducing air pressures on the entire length of the chimney.

In one embodiment, wind vanes force an airflow to slightly rotate as it traverses up a circular chimney. When the rotating wind flow encounters the blades of a wind turbine, the rotation causes the turbine to turn with more force. In one embodiment, two or more adjacent wind turbines rotate in opposite directions to generate more power, much as adjacent sets of blades of a jet turbine rotate in opposite directions to generate more thrust.

In one embodiment a diagonal chimney simply vents great volumes of hot and polluted air out of a populated valley and into the upper air on smoggy days, without generating any electricity. Cleaning smog out of a valley is a medical benefit unto the valley's population.

In one embodiment a constructed chimney top rising 50 feet above a mountain's peak adds a tiny but useful amount of extra rise for power generation within the chimney. For a large-scale diagonal chimney operation, a tiny increase in power generation translates to a considerable gain. Building a considerable distance above an existing mountain peak can be a hazard to aviation.

The Manzares, Spain plant had a chimney top open to the sky. A slight amount of additional power for the chimney's turbine came from the hot air stream creating a vacuum at the chimney's top. In one embodiment, a net gain of power is achieved by gently reorienting a chimney's diagonally rising stream of air to exit closer to straight up from the chimney's top. The warm stream of exiting air is warmer than the ambient air and will continue to try to rise well beyond the chimney's top, creating a vacuum which translates back down as a vacuum at the chimney's top.

A traditional cooling tower has a top that widens. In one embodiment the top of the chimney widens a bit to slow down the rising air column with minimum turbulence, to maximize lift within the chimney.

In one embodiment a flexible chimney top can be tilted a few degrees to the lee side of the day's prevailing wind direction. This creates a bit more power from local wind power. Other chimney top modifications are possible to use the local winds to create an area of low pressure and to draw air out of the chimney top In one embodiment, a fabric wall lifted up by balloons increases the chimney's effective operating height on non-stormy, non-windy days, marginally increasing the chimney's power output.

In one embodiment, a solar chimney with its top end on the prevailing downwind side of its bottom end, and with its top end leaning toward the downwind direction, picks up a bit more power. In general, prevailing wind directions in the temperate Northern Hemisphere are from west to east.

In one embodiment, a solar chimney situated on the south side of a mountain gains better solar collection possibilities, because a greater concentration of sunshine falls on a south-facing slope, because the mountain to the north won't block the sun, and because any clouds formed by condensed water vapor exhaled above the chimney's top will tend to shade land to the north of the mountain, and hence won't block the sun unless these clouds happen to blow due south after their creation.

In one embodiment a water feeder trench or pond of hot water on the bottom of an air feeder tube adds water vapor to hot air.

The inside of a chimney can be a poor work environment, quite hot, dark and windy. For this reason, in one embodiment, heated seawater is continuously pumped into one side of a primary evaporation pond inside the bottom end of the chimney and is then pumped out on the other side. The remaining heavy brine is then further dried to sea salt in a secondary evaporation pond in a less windy antechamber. The antechamber can be connected to the main chimney to use the residual water vapor in the brine, or it can be closed off from the main chimney's air and opened to the outer air for human harvesting of the sea salt. By drying and harvesting sea salt in the antechamber, small dust grains of salt aren't blown up the chimney, where they might cause problems if they were to get into the turbine gears. Also, if fog droplets were to form around salt grains in the chimney's air, the resulting fresh water would have a slight salt content. Salt isn't good for metal objects. For these reasons, in this embodiment salt is made in an antechamber.

As moist air rises it gets cooler. Cool air condenses into fog and clouds. In the embodiment shown in FIG. 17, the upper stage concrete floor sections of a chimney: have grooves (1701a-c) cut in the general direction of the airflow, grooves which collect precipitating water droplets (1702a-d) and channel them off to pipes (1703) beneath the floor. The grooves inhibit standing water droplets from forming and accumulating on the floor. These droplets on the chimney floor would otherwise fight against the upward rising air current and would cause airflow resistance, which would reduce electricity production.

In the presence of negative ionization of the air, fog droplets will attract each other and will consolidate into larger droplets. Within thunderstorms, lightning naturally adds an electric charge to the air. Getting droplets to consolidate and fall out of the diagonally rising air stream is important to getting a stronger updraft in the chimney.

In the embodiment shown in FIG. 18 the chimney air is ionized by discharging electrons through wires into the air. In foggy sections of the chimney the electron ionization process takes place from wires (1801a-c) near or on the chimney's ceiling (1802). In operation, droplets ionized near the roof tend to consolidate and then smoothly drop through an unperturbed air flow to the floor (1803a-f). Ionization generated from the floor isn't expected to be as effective, as descending water droplets would probably quickly carry the electrons out of the air to the floor. In contrast, given little air turbulence, the air near the ceiling will be relatively devoid of approaching large water droplets and so negative ions will disseminate thoroughly into the near-ceiling air, and will stay in the air until used. Note that small-scale air ionization isn't a particularly energy-intensive process, so the chimney is expected to achieve a net power gain through ionization.

In the embodiment shown in FIG. 19, a stream of precipitated water is collected in a pipe (1901) beneath the chimney's floor (1902) is funneled through a U-trap (1903), similar to U-shaped traps underneath a sink. The U-trap preserves any air pressure difference between the air inside the chimney and outside. The U-trap has a method of withstanding freezing during the chimney's down times.

To limit fresh water evaporation, artificially warm distilled water flowing out through the chimney's U-trap is channeled through a heat-shedding radiator coil (1904) and then flows to an underground cistern (1905) for complete cooling.

In one embodiment a moist stream of air is released from the chimney's top on a tall mountain peak, and then the moist air travels upward. The moist upward air current is ionized before its release out of the top of a chimney, so that a greater portion of the remaining water vapor will soon fall as raindrops or as snow. This stream of moist warm air is rapidly cooled, both by its further rising and by its intermixture with high altitude colder air. Some of this stream of moisture then falls on or near the nearby mountaintop as rain or snow, depending on the season. The act of precipitation releases latent heat within the air stream, which fuels a cycle of further rising of the stream of moist air, which can set off further precipitation on or near the mountaintop. At times this stream of moist air feeds into existing cloud formations, enhancing thunderstorm or snowstorm precipitation both on the mountain and downwind. Clouds and enhanced thunderstorm cells may be encouraged in times of drought or when wildfires are burning downwind from the chimney.

In winter, considerable amounts of snow may be precipitated on or near the mountaintop by the stream of moist air leaving the top of the chimney, which interacts with cold mountain air. As the snow accumulates, this snow mass may act as a natural regional water reservoir, with fresh water melting throughout the summer as new rain from the chimney top falls upon it and melts it. In one embodiment the chimney top's snowmaking ability supports snowmaking efforts at a nearby ski resort.

In one embodiment, on a high hill or mountain, large amounts of water from snow stored on the mountaintop last winter and which are currently melting, and water newly distilled from an operating chimney, are stored in a pond high on the chimney's mountain. This stored water can then be dropped through hydroelectric turbines during a particular day's peak period electric consumption, and then the stream is a usable source of fresh water.

In one embodiment a stream of vapor rises above the mountain peak to form cirrus clouds above the mountaintop level. These clouds partially counteract global warming over a small region of the country, or the clouds blow over a nearby downwind ocean where almost no one has an interest in maximizing solar energy, and they shade the ocean somewhat. Other artificially formed cirrus clouds such as jet contrails are known to reflect a portion of sunlight back into space. Because water vapor acts as a greenhouse gas, artificially created clouds have various effects on global warming depending on their thickness and the time of day that they are created. Artificially created thunderstorm cells also affect a region's general precipitation patterns.

In the embodiment shown in FIG. 20, the chimney air is moist, but precipitation and cloud enhancements beyond the chimney's top are unwanted and need to be minimized. At the top of the chimney is a device that spreads the chimney's outflow. Starting from a normal chimney cross-section (2001) the chimney top flattens (2002), then it branches into many tubes (2003a-c) which spread out across a mountain top or ridgeline like the tines on a garden rake. Each of these branches has holes on top (2004a-i) that release roughly parallel streams of air upward. The streams of air immediately mix with the cold natural airflow blowing across the mountain top (2005) to create a substantially rectangular solid of a cloud (2006). The cloud dissolves away at a certain height (2007) as the moist chimney air thoroughly mixes with the dry air and as any fog droplets re-evaporate. By varying the sizes of the individual holes on the tops of the tubes, the shape of the cloud's top may be changed from a substantially rectangular solid to a more artistically cloudlike appearance.

In one embodiment, positive ions are added to a moist chimney exit stream of fog or air, in order to inhibit precipitation above the chimney.

In one embodiment, temporary fabric walls are raised above the chimney's top end on days with low wind, which typically are sunny days ideal for power generation. These fabric walls increase the chimney's effective height and so increase power generation. The temporary chimney walls are lowered and stowed away in high winds.

Hang gliding enthusiasts may be drawn to circle above the top of a chimney. In one embodiment a chimney has a net strung across the top of the chimney to stop hang glider enthusiasts from falling into the chimney. In one embodiment, smaller nets are placed across the diagonal chimney floor, to stop hang gliding enthusiasts who may have fallen into the chimney from sliding downward on the chimney floor until they encounter a turbine blade. In one embodiment, doors with translucent or transparent sections are provided in a chimney wall to allow trapped hang glider enthusiasts to escape, or to allow rescuers or workers in. Even an intense heat generated in the air at the chimney's low end might somewhat dissipate with a great altitude change, to the point where a person accidentally trapped in the top of the chimney might still be able to function for a few minutes, albeit in sauna-like conditions on hot days.

Dwellers in a nearby city might object to the chimney's ugliness amidst the original natural beauty. In one embodiment, the outside cover of the chimney snaking up a mountainside is painted to look exactly the same color as the terrain looked previous to building the chimney, especially as seen from the direction of that city.

In one embodiment, colored translucent fabric is hung from cables on the sides of the chimney. In use, those pieces of fabric are either front-lit or back-lit by the sun to give off light roughly equal in color and in intensity to what the natural terrain had previously emitted in the direction of the nearest major city. This camouflage trick with light reduces any sun shadow lines that might be seen on either side of the chimney. The translucent panels might only disguise the chimney's shadowed area at certain times of the day.

In the embodiment shown in FIG. 21, an array of independently focused tracking reflectors (2101a-c) track the sun minute by minute to refocus sunlight all day into the open mouth of a tube (2102). The tube is lined with reflecting mirror surfaces on all sides (2104a-b) as it reflects collected light around corners (2105a-b) to an underground air feeder tube (2106) leading toward the start of a diagonal chimney. By reflecting light around corners, both radiational and convection heat losses from the mouth of the airflow tunnel are lowered. By drawing surface air steadily but slowly into the tube with slight negative air pressure, convectional heat losses from the mouth of the tube are further lowered. An extension of the chimney below ground level extends the chimney's functional elevation from its heating level to its top, uses more rock as a heat sink, and uses the rock as insulation. While the sun shines on reflectors up above, the actual heating of the air takes place at a low, more useful altitude.

In one embodiment, the reflecting mirror surfaces in such an underground tube are not laid flat on the walls, roof and floor, but one edge of each mirror is set a bit away from a wall to create air turbulence. As a result, a smaller amount of air is pulled into the underground tube through negative air pressure, or is blown out of the underground tube, and no window that would reflect some of the concentrated heat back out of the underground tube is needed to stop airflow.

In one embodiment, the rock walls, floor and roof at the entrance of an underground tube are melted and fused by concentrated solar heat into mirrored surfaces.

In one embodiment, a single layer of windowpanes covers the tube's open mouth. A windowpane reflects some of the incoming concentrated light back out, but no air escapes through the underground tube.

The chimney runs on a number of diffuse heat sources that almost no other electricity generating system can use, and which are considered waste products in our society. The waste steam from a nearby solar thermal plant becomes useful. A thermal smog inversion is a heat source. Smokestack heat can help drive the chimney. The chimney can derive power from brackish, lukewarm geothermal water. Agricultural wastewater and sewage can be moisture sources. Moist air extracted from sewer pipes contains useful latent heat in its moisture.

Unlike most electricity generation systems, the solar chimney benefits mightily from efficiencies of scale. The storage of heat is ever more cost efficient in extremely large storage tanks or rock formations, the relatively undisturbed ground itself becomes both a seasonal and a diurnal heat sink, and heat storage leads to more hours per day of useful wind turbine usage in the chimney. A greater height of the chimney, caused by the use of a tall mountain, plays a part in geometrically adding power efficiency to the system. The larger the system, the less air friction per kilowatt-hour. Achieving greater heat in the chimney geometrically adds power to the system. A doubling of a chimney's radius results in a quadrupling of the chimney's cross-section, and results in a greater wind velocity through the chimney's center due to less air friction from the walls.

Because of these efficiencies of scale, the potential exists for this new type of electricity generation scheme to produce vast amounts of renewable electricity at an extremely cheap rate per kilowatt-hour.

Moreover, large volumes of heat might be inexpensively stored, and then electricity can be generated at a region's daily peak demand times. The solar chimney can serve the peak power niche. More than most other renewable energy applications, the chimney's standard daily peak power generation profile can closely match our society's daily peak power demand.

In addition, potentials exist for distilling and selling fresh water in arid areas, for counteracting the rainfall effects of global warming on a regional scale, for sucking smog and hotter air out of inland western valleys, and for washing particulates out of large quantities of polluted air.

Although said invention has been described with respect to various embodiments, it should be realized this invention is also capable of a wide variety of further and other embodiments.

What is claimed is:

1. A chimney and one or more air feeder tubes, where the air feeder tubes do not substantially gain or lose net elevation before connecting with the chimney's lower end, where the chimney gains elevation and where a rising geographic terrain substantially helps to support the chimney as the chimney substantially slopes diagonally upwards, so that relatively hot air in the chimney will rise up the chimney, the chimney and one or more air feeder tubes comprising one or more openings to the atmosphere at substantially the far ends of one or more air feeder tubes from where the air feeder tubes meet the chimney, one or more openings to the atmosphere at substantially the chimney's top end, a flow of atmospheric air or a mixture of air and other gases into the far ends of the air feeder tubes, through the air feeder tubes, up the chimney and out of the openings at the chimney's top, a device by which the gases are progressively heated by the sun's rays as the gases travel down substantial parts of the air feeder tubes to the chimney, whereby the gases are pre-heated for use in the chimney, one or more wind turbines or other devices to generate electricity from the draft generated inside the chimney by rising relatively hot gases, wherein the force of the relatively hot gases rising up the diagonal chimney drives the wind turbines or other electricity-generating devices, generating electric power, and one or more insulated chambers embedded in one or more of the air feeder tubes, which are substantially filled with earth or rock, through which the flow of air travels before the air travels up the chimney, with air tunnels or air capillaries within the earth or rock that allow substantially all small streams of the incoming air to transfer heat to or from the earth or rock while minimizing air friction, so that great amounts of heat at sunny and at warmer times will be efficiently transferred by the flow of air into the insulated chamber's earth or rock, and during dark and at colder times heat will be transferred back from the earth or rock into the air flow, whereby the chimney can run on heated air and supply electric power at hours of the day and night when immediate heat is not available from the sun or from some other source.

2. The chimney and one or more air feeder tubes in claim 1, with a substantial part of one or more of the air feeder tubes being a trench, where the trench's top is covered with a heat-absorbing, transparent or translucent cover onto which the sun's rays can substantially shine, where in use the sun's rays will make the air in the air feeder tube hotter.

3. The chimney and one or more air feeder tubes with trench in claim 2 with a trench enclosure cover slanting from the enclosure's high north side to the enclosure's low south side, whereby the cover safely sheds hail, snow and rain at an angle, and whereby the slanted cover captures the sun's direct heat better than an unslanted cover, where in the temperate Northern Hemisphere at least one of the trench enclosures has a higher substantially northern wall than its substantially southern wall, where directions would be reversed in the temperate Southern Hemisphere to face the sun's path.

4. The chimney and one or more air feeder tubes in claim 1, where one or more of the air feeder tubes, the chimney, or both, substantially has two or more wall layers where one layer maintains structural integrity against air pressure differentials and one layer is an inner fairing, comprising two or more solid supports running lengthwise on a chimney or feeder tube's inside wall, ceiling or floor, oriented in the chimney or air feeder tube's direction of air flow, one or more fabric, plastic or flexible sheets held reasonably taut between two such adjacent struts, and a glue or device to hold the fabric, plastic or flexible sheets to the supports, where in use air turbulence points on the wall, ceiling or floor are reduced.

5. The chimney and one or more air feeder tubes in claim 1, where substantial parts of the chimney or one or more feeder tubes are kept inflated by positive air pressure inside the chimney or air feeder tubes.

6. The chimney and one or more air feeder tubes in claim 1, with one or more solar targets on or near the outer wall of the chimney or a feeder tube to the chimney, which will either substantially transmit light into the chimney or an air feeder tube or will convert sunlight to heat and substantially transfer the heat into the chimney or an air feeder tube by some device, an array of one or more sun-tracking reflector panels at a distance of at least 100 feet from it's corresponding solar target, and a device to have the arrays track the sun, whereby good amounts of highly concentrated heat may be efficiently reflected from a relatively distant field or slope to the chimney's air.

7. The chimney and one or more air feeder tubes in claim 1, with one or more struts or towers extending above or to the sides of the chimney or an air feeder tube, with one or more main cables running in the same direction as the chimney or feeder tube, with two or more regularly spaced wall support cables running in the direction of the circumference of the chimney or feeder tube and pulled outward from the chimney or feeder tube's center by one or more main cables, with anchors in the ground for the ends of those cables which are anchored in the ground, and with fabric, plastic or other tensile sheeting stretched between these wall support cables, whereby a negative air pressure will be maintained in parts of the chimney or feeder tube.

8. The chimney and one or more air feeder tubes in claim 1, with a paved, tarred or otherwise darkened open area near one or more of the openings to the atmosphere of the air feeder tubes, and with a negative air pressure or other air-moving system to draw air warmed by the nearby darkened open area into the air feeder tube.

9. The chimney and one or more air feeder tubes in claim 1, where all or a substantial part of the chimney or of one or more air feeder tubes has concrete walls or earthen embankments on the chimney's or the air feeder tube's sides and a flexible roof, whereby the wind shadow in cross-winds of the flexible part of the chimney or tubes is lowered.

10. The chimney and one or more air feeder tubes in claim 1, with two or more wind turbines in series within the chimney's interior, where each turbine generates a small positive air pressure on the chimney's walls in front of that turbine and a small negative pressure behind the turbine, whereby maximum pressure stresses on the chimney's walls and roof are reduced, and chimney construction materials will then be engineered to handle lighter air pressures.

11. The chimney and one or more air feeder tubes in claim 1, with a closed loop active solar heat gathering system comprising a heat storage system and a heat dispersal system connected to the low end of the chimney, and with a control device to selectively use heat stored in the heat storage tank to regulate the amount of power generation potential in the chimney, where the chimney's stream of air, preheated by a variable amount of sunshine and geothermal storage, is brought up to a specific energy generation temperature, at which point the chimney maximizes the turbines' or other electricity-generating devices' electricity production.

12. The chimney and one or more air feeder tubes in claim 1, where the chimney's supply of air or gases is laden with water vapor, where the air or gases laden with water vapor cool with altitude as they rise up the chimney, so that water condenses out of the rising air or gases and releases heat which further drives the chimney's upward flow, and additional useful lift is generated in the stream of air or gases by the released heat.

13. The chimney and one or more air feeder tubes in claim 12, with one or more feeder enclosures equipped to convey warmed water and/or gases laden with water vapor into the chimney's bottom end or into air feeder tubes from a distance, where water vapor is added to the chimney's air.

14. The chimney and one or more air feeder tubes in claim 13, where one or more of the feeder enclosures are canals that simultaneously convey both water, either pure water or water containing impurities, and air or gases laden with water vapor above the water's surface, to the chimney or to one or more air feeder tubes, and the device by which the gases are progressively heated by the sun's rays also heats or evaporates the water as the gases and the water travel down the tubes or enclosures to the chimney, whereby the pure water or water mixed with other substances is simultaneously moved through the enclosures and pre-warmed for chimney use while in transit.

15. The chimney and one or more air feeder tubes in claim 12, where water vapor put into the chimney's lower end and condensed within the chimney or beyond the chimney's top end is deposited on terrain near to the top of the chimney as fog, rain, sleet, frozen rain or snow, and a device by which locally enhanced precipitation condensed within the chimney or beyond the chimney's top end is collected from the terrain for use as water.

16. The chimney and one or more air feeder tubes in claim 12, with one or more water pipes or water conveyance devices with a U-trap bend, which are connected to one or more drains in the chimney's floor or walls, which can maintain the pressure differential between the outdoor air and indoor air without air leakage while allowing a stream of condensed water to freely flow out of the chimney's interior, whereby quantities of accumulating water may be transported out of the chimney at the chimney's higher elevations.

17. The chimney and one or more air feeder tubes in claim 12, with a structure on the chimney's top end which splits the exiting air stream into two or more smaller exit air streams, where the chimney's exhaust air or gases mix more quickly with ambient outside air and moisture is dispersed into the ambient outside air more quickly, whereby adverse cloud and precipitation impacts are reduced above the chimney's top.

18. The chimney and one or more air feeder tubes in claim 12, with a geothermal source of warm water for water vapor generation.

19. The chimney and one or more air feeder tubes in claim 12, with one or more sources of water vapor that are waste air laden with water vapor, from industrial, commercial, government or residential sites.

20. The chimney and one or more air feeder tubes in claim 12, with a source of impure water, with a tertiary water evaporation pond which is not inside a windy part of the chimney, which can at times feed moisture into the chimney's air, and which at other times can be separated from the chimney's heated air, giving workers easy access for cleaning out any solids precipitated into the pond during evaporation, and with a device for supplying the impure water to the tertiary water evaporation pond as needed, whereby dried wind-blown particulates are kept out of the chimney, and workers need not clean out the tertiary water evaporation pond's solids in a hot and windy environment.

21. The chimney and one or more air feeder tubes in claim 12, with an air ionizing device which discharges ions inside the chimney, such that electrically charged cloud and fog droplets will be substantially attracted to each other, will combine, and will then precipitate out of the air stream rising in the chimney, or fog droplets will be attracted to the walls of the chimney.

22. The chimney and one or more air feeder tubes in claim 12, with fog netting or another fog droplet catching device in or above the chimney to substantially remove cloud and fog droplets from the rising air stream, whereby the chimney's updraft may be strengthened.

23. The chimney and one or more air feeder tubes in claim 12, with a device to take condensed distilled water out of the chimney, and with a device to cool the relatively warm distilled water exiting the chimney, whereby less of the condensed distilled water is lost to evaporation.

24. The chimney and one or more air feeder tubes in claim 12, with particulates in intake gases, where the process of water vapor condensation substantially scrubs the particulates out of the gases.

25. The chimney and one or more air feeder tubes in claim 12, with a device for adding positive ions to the chimney's gases before the release of the gases from the chimney's top, or with a device for subtracting negative ions from the gases before the release of the gases from the chimney's top, to reduce precipitation within the stream of air flowing out of the chimney's top, whereby adverse precipitation effects above the chimney's top will be inhibited.

\* \* \* \* \*